Patented Aug. 13, 1935

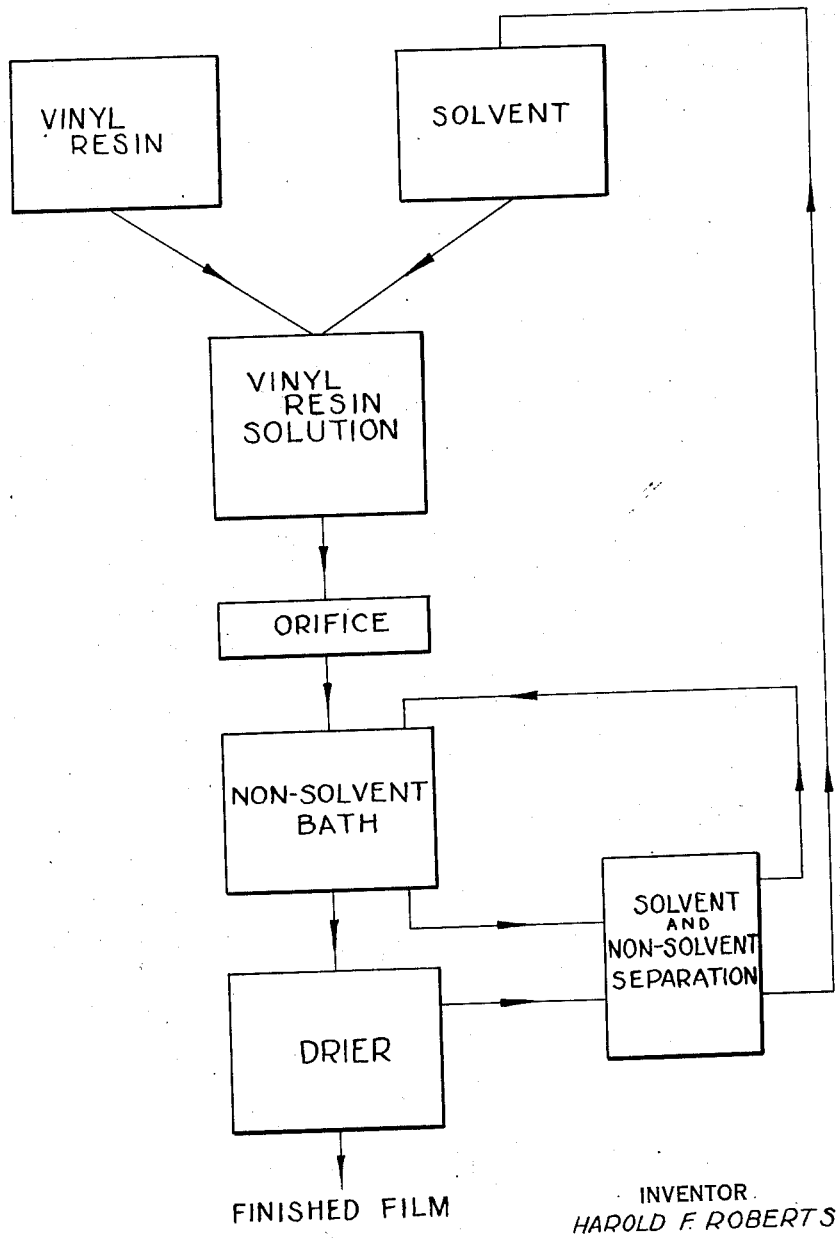

2,010,963

UNITED STATES PATENT OFFICE 2,010,963

PROCESS FOR MAKING FILMS AND THE LIKE AND PRODUCTS THEREBY MADE

Harold F. Robertson, Coraopolis, Pa., assignor to Carbide and Carbon Chemicals Corporation, a corporation of New York Application November 22, 1933, Serial No. 699,100

REISSUED

20 Claims. (Cl. 18—57)

The present invention pertains to the production of film, webs, sheets, filaments and the like from vinyl resins and vinyl resin compositions.

Vinyl resins, that is, artificial resinous products obtained by the polymerization of certain vinyl compounds, are known and have been proposed for many uses. It has been proposed to make thin sheets or webs from vinyl resin compositions, but the means proposed for producing this form of product have been unsatisfactory, and have never been adapted to the successful manufacture of vinyl resin films or the like. In general, the previously proposed methods for making thin sheet products from vinyl resins have comprised either plating out a solution of the resin on a smooth surface and stripping therefrom the film formed upon drying, or pressing thin portions of solid resin between heated platens or calender rolls. In addition to these methods which have been attempted, Patent No. 1,241,738 to Klatte and Rollett states that solutions of vinyl acetate polymers may be squirted into a precipitating agent, such as alcohol or ether, to form a product in thread form.

So far as I am aware, none of these methods have been used on a large scale for the formation of vinyl resins in the form of thin sheets, films, webs or filaments. Obviously, from the standpoint of economy and flexibility of operation, the most desirable method to use would comprise the precipitation of the resin in the desired form from a solution, but despite the teaching of the Klatte et al. patent this is not possible as therein described. When a stream of a solution of vinyl resin is added to a non-solvent or a precipitating agent, the latter displaces the solvent and the resin is precipitated as a white opaque mass in the form of the stream of solution which was added to the non-solvent, but it will not be a clear, transparent or usable film.

The principal object of my invention is to provide a new process for making films, webs, sheets, filaments and the like from vinyl resins and to make available these new films, etc. Another object is to provide method for making films, webs, sheets, filaments and the like from vinyl resins which employs a solution of the resin and a precipitating agent or non-solvent. Another object is to provide a new process for spinning vinyl resins to form useful threads and filaments.

I have found by experimentation that I am enabled to achieve successfully the objects of the invention by selecting particular conditions under which the extrusion, spinning or squirting of a vinyl resin solution into a bath of non-solvent or a precipitating agent is conducted. In general, these conditions comprise passing a shaped stream of vinyl resin solution into a bath of precipitating agent or non-solvent for the resin and removing the stream of vinyl resin from the bath at a rate which prevents the removal by the non-solvent of all the solvent in the stream of vinyl resin solution, but which permits the removal of sufficient solvent to cause the stream of vinyl resin to coagulate on the surface and become coherent. The stream thus solidified enough to assume a definite shape is treated to remove the balance of solvent from its interior and the removal of this residual solvent likewise removes any non-solvent from the surface. A continuous, smooth, hard, and coherent body of vinyl resin is thus obtained which is in the form given to the initial stream of the solution, and which is self-glossed and polished by the action of the solvent removal.

The new process is well adapted for a continuous process of manufacturing films, webs, sheets, filaments, threads or the like from vinyl resins. Any vinyl resin which has physical properties suitable for the particular form being made may be used in my new process. Since the process is primarily useful for making forms of vinyl resins in which at least one dimension of the final form produced is very small, the resin used in the process must be tough, flexible and strong enough to be useful when made into forms of minute dimensions. I prefer to use those vinyl resins which are made by conjointly polymerizing two or more vinyl derivatives, of which vinyl halides, particularly the chloride, vinyl esters of aliphatic acids, such as vinyl acetate, propionate and butyrate, and vinyl benzene or styrene are illustrative. Particularly desirable vinyl resins are those resulting from the conjoint polymerization of vinyl chloride and vinyl acetate in the proportions of from about 70 to 93 parts of vinyl chloride with about 30 to 7 parts of vinyl acetate. Individual vinyl derivatives when polymerized may be used, such as vinyl chloride, acetate, propionate or styrene, provided they possess the necessary physical properties for the product to be made. Vinyl resins which are strong, tough, and flexible and suitable for use in my process may be prepared by special methods of polymerization, for instance, by conducting the polymerization reaction at temperatures below 60° C., preferably below 40° C. with a small amount of catalyst, and in the presence or absence of solvents or liquid media. However, if liquid media are employed they should be chosen from those substances which are non-solvents or poor solvents for vinyl resins, and as little as possible of the liquid should be used. Vinyl resins and processes of making them are not a part of this invention.

The following detailed description will illustrate the mode of practicing my invention, but these illustrations are not to be considered as limitations on the invention. The flow of materials in the process may be as shown in the accompanying drawing.

A vinyl resin was prepared by conjointly polymerizing vinyl chloride and vinyl acetate in the absence of any liquid medium or solvent other than the vinyl compounds. The temperature during the polymerization was maintained at about 30° C. Benzoyl acetyl peroxide in an amount equal to about 0.4% by weight of the vinyl compounds was used as a catalyst. The resin obtained contained about 85% of vinyl chloride in the conjoint polymer, and was dissolved in acetone and filtered free of suspended matter to obtain a clear, substantially water-white solution.

The solution of resin in acetone was then made into film by extruding the solution by pneumatic pressure from a reservoir through an extrusion slit into water as a precipitating agent. The temperature of the water was kept at about 35° C. Air pressure in varying amounts was used to effect the extrusion. As before noted, the film formed was white and opaque and could not be dried at the temperatures used to give a clear transparent film if it was allowed to remain in the precipitating bath. The period which the film remained in the precipitating bath was regulated by the linear speed of extrusion, and was adjusted to be such as to make the film just coherent and strong enough for handling as it left the precipitating bath. From the precipitating bath the film was passed through a horizontal drier heated by a current of hot air. The temperature in the drying tower was about 50° to 60° C. The remaining solvent, and any of the water from the precipitating bath which was in the film was here removed, and the dried film was rolled onto spools. The finished product was clear, flexible and transparent and possessed good strength.

The table below shows operating data of the process illustrating the effect of the several variables.

Solvent_____ Acetone
Precipitating bath_____ Water
Orifice_____ 0.0100 x 7 inches

| Concentration of solution, % resin by wt. | Viscosity solution sec. at 20° C. | Air pressure, lbs./sq. in. | Film speed, ft./min. | Tension on film, lbs. | Dry film thickness, inches |
|---|---|---|---|---|---|
| 30 | 6.4 | 1.25 | 2.75 | 1.4 | 0.0008 |
| 30 | 6.4 | 1.50 | 2.75 | 1.4 | 0.0010 |
| 30 | 6.4 | 2.00 | 2.75 | 1.4 | 0.0013 |
| 30 | 7.4 | 3.00 | 3.75 | 1.4 | 0.0015 |
| 30 | 7.4 | 2.00 | 3.75 | 1.4 | 0.0012 |
| 30 | 7.4 | 2.50 | 3.75 | 1.4 | 0.0014 |
| 30 | 7.4 | 0.875 | 3.75 | 1.4 | 0.0007 |
| 30 | 7.4 | 1.25 | 3.75 | 1.4 | 0.0009 |
| 30 | 7.4 | 1.125 | 3.75 | 0.9 | 0.0008 |
| 36 | 220.0 | 22.0 | 3.88 | 1.4 | 0.0024 |

The viscosity figures were obtained by measuring the time required for a steel ball having a diameter of 0.1875 inch to fall through 10 centimeters of the solution.

The tension referred to is that force applied to the dried and cooled film and is effective between the drier discharge and the reel for the finished film.

In these operations the drying temperature was between 50° and 70° C.

The precipitating bath may be used satisfactorily until it contains as much as 75% acetone. The acetone-water mixtures obtained from the precipitating bath and the drying tower may be fractionated in the usual way to recover the two materials for reuse. It will be apparent that by regulating the film speed the period which the resin stream remains in the precipitating bath can be adjusted to produce the proper degree of precipitation regardless of the size of the bath. The temperature of the precipitating bath has an effect upon the quality of film produced. For example, if the bath is at a low temperature, precipitation is slow and the resulting film may exhibit striations. Therefore, it is desirable to effect precipitation as rapidly as possible. I have found that precipitation will occur at any temperature in the bath between 0° and 50° C., but I prefer the range of about 25° to 35° C., and temperatures of about 35° C. are desirable.

It is possible to produce thicker film, that is, in thicknesses up to 0.007 or 0.008 inch, by increasing the content of vinyl resin in the solution. For example, a solution containing about 70% vinyl resin may be used, but since such a solution at ordinary temperatures is a thick gel, it must be heated and extruded while maintaining its temperature sufficiently high to prevent gel formation, for example, at about 60° C. In forming film from these concentrated solutions, greater air pressure may be used on the vinyl resin solutions. Pressures of 40 pounds per square inch or even greater have been used satisfactorily.

Other solvents and precipitating agents may be used. In general, any solvent for the vinyl resin may be used, and any non-solvent may serve as the precipitating medium, provided that the non-solvent used is at least partially miscible with the particular solvent employed. Preferably, to expedite precipitation, the solvent and non-solvent used are selected so that they are completely miscible. Examples of solvents are: ketones, such as methyl ethyl ketone, dipropyl ketone, cyclohexanone and methyl butyl ketone; cyclic dialkylene dioxides, such as 1.4 dioxane and dimethyl dioxane; esters, such as ethyl acetate and butyl acetate; halogenated hydrocarbons, such as chlorbenzene, ethylene and propylene dichlorides or dibromides and acetylene tetrachloride; and aromatic hydrocarbons, such as toluene and xylene. Suitable non-solvents are: water, paraffin hydrocarbons, such as pentane, hexane and heptane; aliphatic alcohols, such as methanol, ethanol, isopropanol and ethylene glycol; and aliphatic ethers, such as diethyl, diisopropyl and dibutyl ethers.

The vinyl resin solution may have modifying substances incorporated therein to vary specific properties of the film. For example, plasticizers, such as dibutyl phthalate, di (ethylene glycol monobutyl ether) phthalate, tricresyl phosphate, chlorinated naphthalenes and diphenyl derivatives to make the film more flexible; waxes may be added to increase the moisture resistance of the film and to decrease any tendency to tackiness; dyes or pigments may be added to produce colors and varying degrees of translucency or opacity; or other known modifying agents may be added to the resin. In this connection, a particular advantage inures to the use of water as a precipitating agent, since it is possible to use modifying substances in the resin which might be partially or wholly extracted by media, such as alcohols or ethers, and which are unaffected by water. The plasticizers may be used in any amount up to about 20% or somewhat more based on the weight of vinyl resin. About 18% of di (beta-butoxy ethyl) phthalate has been found to be very successful in producing flexible films which are readily produced by my process, and which are not tacky. Waxes may be used in amounts less than 2% by weight of the vinyl resin, and a preferred quantity is about 0.5%. Suitable waxes are those composed largely of paraffin hydrocarbons, such as paraffin wax, ceresin wax, Japan wax and the like. The addition of wax greatly increases the moisture resistance of the film. For example, a film containing 0.5% paraffin wax and 18% di (beta-butoxy ethyl) phthalate was found to transmit moisture at a rate only one-third as great as that of unmodified film.

The wax may be best incorporated in the film by forming a solution of it in a wax solvent, such as toluene, mono-chlorbenzene, benzene, or the like, and this solution is then added to the vinyl resin solution. Necessarily this results in a vinyl resin solution which contains a few per cent. of water-insoluble solvent, but I have found that this does not interfere with proper precipitation of film in a water precipitating bath.

The surfaces of the rolls, guides and other mechanical parts of the film forming equipment may be lubricated to facilitate slipping of the film thereover. As lubricants, I prefer to use alcohols or alcoholic compositions. The alcohols used should be relatively non-volatile at the temperatures used for drying the film, and must be capable of spreading and wetting the film or roll surfaces. I prefer to use polyhydric alcohols of high boiling point together with monohydric alcohols to prevent coalescence of the lubricant on the surfaces. Ethylene and propylene glycols or poly glycols and glycerine are suitable polyhydric alcohols, and butyl, amyl, hexyl and octyl alcohols are suitable monohydric alcohols. A useful lubricant may be a mixture of diethylene glycol and butyl alcohol. The lubricant is preferably removed from the film by washing or otherwise before it is reeled into rolls. The use of a lubricant is essential, for otherwise the handling of the film on heated rolls would be exceedingly difficult.

Drying temperatures up to about 110° C. may be used, and the heat may be applied to the film in any desired manner. I prefer to use a current of heated air supplied countercurrent to the direction in which the film to be dried is passed. A drying temperature of about 70° C. is preferred.

The foregoing description has been particularly directed to the production of sheets, films or webs, but it is to be understood that filaments, threads and the like may be produced by the same process depending only upon the size and shape of the extrusion orifice used. The term "films" as employed in the appended claims will be understood to include films, thin sheets, webs, threads, filaments and all like physical forms in which at least one dimension of the cross-section is small.

This application contains subject matter in common with my co-pending application Ser. No. 653,485, filed January 25, 1933.

I claim:—

1. Process of making films from vinyl resins which comprises forming a shaped stream of a vinyl resin-containing solution, passing said shaped stream into a precipitating bath containing a liquid which is a non-solvent for the vinyl resin and which is at least partially miscible with the solvent in said solution, removing said shaped stream from said bath at a rate which permits the resin in said stream to precipitate only to an extent which will cause the shaped stream to retain its shape, and thereafter subjecting said shaped stream to heat whereby remaining solvent and the non-solvent therein are eliminated.

2. Process of making films from vinyl resins which comprises forming a solution containing a vinyl resin, forcing the solution through an orifice to form a shaped stream of vinyl resin-containing solution, passing said shaped stream into a precipitating bath containing a liquid which is a non-solvent for the vinyl resin and which is at least partially miscible with the solvent in said solution, removing said shaped stream from said bath at a rate which permits the resin in said stream to precipitate only to an extent which will cause the shaped stream to retain its shape, thereafter drying said shaped stream by means of heated air to eliminate solvent and non-solvent therefrom.

3. Process of making films from vinyl resins which comprises forming a solution containing a vinyl resin, forcing the solution by pneumatic pressure through an orifice to form a shaped stream of vinyl resin-containing solution, passing said shaped stream into a precipitating bath containing a liquid which is a non-solvent for the vinyl resin and which is at least partially miscible with the solvent in said solution, removing said shaped stream from said bath at a rate which permits the resin in said stream to precipitate only to an extent which will cause the shaped stream to retain its shape, thereafter drying said shaped stream by means of air heated between about 50° and about 110° C. to eliminate solvent and non-solvent therefrom.

4. Process for making films from vinyl resins which comprises forming a vinyl resin solution in acetone, forcing the solution through an orifice to form a shaped stream of vinyl resin-containing solution, passing said shaped stream into a precipitating bath containing a liquid which is miscible with acetone and which is a non-solvent for the vinyl resin, removing said shaped stream from said bath at a rate which permits the resin in said stream to precipitate only to an extent which will cause the shaped stream to retain its shape, and thereafter drying said shaped stream to eliminate acetone and the non-solvent therefrom.

5. Process for making films from vinyl resins which comprises forming a vinyl resin solution in acetone, forcing the solution through an orifice to form a shaped stream of vinyl resin-containing solution, passing said shaped stream into a precipitating bath containing water, removing said shaped stream from said bath at a rate which permits the resin in said stream to precipitate only to an extent which will cause the shaped stream to retain its shape, and thereafter drying said shaped stream to eliminate acetone and the water therefrom.

6. Process for making films from vinyl resins which comprises forming a vinyl resin solution in acetone, forcing the solution through an orifice to form a shaped stream of vinyl resin-containing solution, passing said shaped stream into a precipitating bath containing at least 25% of water, removing said shaped stream from said bath at a rate which permits the resin in said stream to precipitate only to an extent which will cause the shaped stream to retain its shape, and thereafter drying said shaped stream to eliminate acetone and the water therefrom.

7. Process for making films from vinyl resins which comprises forming a solution in acetone of a vinyl resin substantially identical with a resin resulting from the conjoint polymerization of vinyl chloride and vinyl acetate, forcing the solution through an orifice to form a shaped stream of vinyl resin-containing solution, passing said shaped stream into a precipitating bath containing water, removing said shaped stream from said bath at a rate which permits the resin in said stream to precipitate only to an extent which will cause the shaped stream to retain its shape, and thereafter drying said shaped stream to eliminate acetone and the water therefrom.

8. Process for making films from vinyl resins which comprises forming a solution in acetone of a vinyl resin substantially identical with a resin resulting from the conjoint polymerization of vinyl chloride and vinyl acetate in the proportions of at least about 80% of the chloride, forcing the solution through an orifice to form a shaped stream of vinyl resin-containing solution, passing said shaped stream into a precipitating bath containing water, removing said shaped stream from said bath at a rate which permits the resin in said stream to precipitate only to an extent which will cause the shaped stream to retain its shape, and thereafter drying said shaped stream to eliminate acetone and the water therefrom.

9. Process for making films from vinyl resins which comprises forming a solution in acetone of a vinyl resin and a plasticizer therefor, forcing the solution through an orifice to form a shaped stream of vinyl resin-containing solution, passing said shaped stream into a precipitating bath containing water, removing said shaped stream from said bath at a rate which permits the resin in said stream to precipitate only to an extent which will cause the shaped stream to retain its shape, and thereafter drying said shaped stream to eliminate acetone and the water therefrom.

10. Process for making vinyl resin films which comprises forming a solution in acetone of a vinyl resin substantially identical with a resin resulting from the conjoint polymerization of vinyl chloride and vinyl acetate in the proportions of at least about 80% of the chloride, forcing the solution by pneumatic pressure through an orifice to form a shaped stream of vinyl resin-containing solution, passing said shaped stream into a precipitating bath containing at least about 25% of water, removing said shaped stream from said bath at a rate which permits the resin in said stream to precipitate only to an extent which will cause the shaped stream to retain its shape, and thereafter subjecting said stream to air heated between about 50° and about 110° C. to eliminate acetone and water therefrom.

11. Process for making vinyl resin films which comprises forming a solution in acetone of a vinyl resin substantially identical with a resin resulting from the conjoint polymerization of vinyl chloride and vinyl acetate in the proportions of at least about 80% of the chloride, forcing the solution by pneumatic pressure through an orifice to form a shaped stream of vinyl resin-containing solution, passing said shaped stream into a precipitating bath containing at least about 25% of water which is maintained at a temperature between about 25° and 35° C., removing said shaped stream from said bath at a rate which permits the resin in said stream to precipitate only to an extent which will cause the shaped stream to retain its shape, and thereafter subjecting said stream to air heated between about 50° and about 110° C. to eliminate acetone and water therefrom.

12. Process for making film from vinyl resins which comprises forming a solution in acetone containing a vinyl resin identical with a resin resulting from the conjoint polymerization of a vinyl halide and a vinyl ester of an aliphatic acid, a plasticizer and a wax; forcing the solution by pneumatic pressure through an orifice to form a shaped stream of said vinyl resin-containing solution; passing said shaped stream into a precipitating bath containing at least 25% of water; removing said shaped stream from said bath at a rate which permits the resin in said stream to precipitate only to an extent which will cause the shaped stream to retain its shape, and thereafter eliminating acetone and water therefrom.

13. A flexible, non-tacky film composed of a vinyl resin identical with a resin resulting from the conjoint polymerization of a vinyl halide and a vinyl ester of an aliphatic acid, said film being continuous, smooth, hard and coherent, and being self-glossed and polished by the removal of solvent and non-solvent liquid media from said film after it is formed.

14. A flexible, non-tacky film composed of a vinyl resin identical with a resin resulting from the conjoint polymerization of vinyl chloride and vinyl acetate, said film being continuous, smooth, hard and coherent, and being self-glossed and polished by the removal of solvent and non-solvent liquid media from said film after it is formed.

15. A flexible, non-tacky film composed of a vinyl resin and a wax, said film being moisture-resistant, continuous, smooth, hard and coherent, and being self-glossed and polished by the removal of solvent and non-solvent liquid media from the film after it is formed.

16. A flexible non-tacky film composed of a vinyl resin identical with a resin resulting from the conjoint polymerization of vinyl chloride and vinyl acetate in the proportions of at least about 80% of the chloride, together with about 18% di (beta-butoxy ethyl) phthalate and 0.5% paraffin wax based on the weight of vinyl resin; said film being moisture-resistant, continuous, smooth, hard and coherent, and being self-glossed and polished by the removal of solvent and non-solvent liquid media from the film after it is formed.

17. Process for making films from vinyl resins which includes the step of removing solvent and non-solvent from the partly formed film by subjecting said film to heat while it is supported upon surfaces lubricated with an alcoholic composition.

18. Process for making films from vinyl resins which includes the step of removing solvent and non-solvent from the partly formed film by subjecting said film to heat while it is supported upon surfaces lubricated with an alcoholic composition which is relatively non-volatile at the drying temperature employed.

19. Process for making films from vinyl resins which includes the step of removing solvent and non-solvent from the partly formed film by subjecting said film to heat while it is supported upon surfaces lubricated with an alcoholic composition which comprises polyhydric alcohols together with monohydric alcohols.

20. Process for making films from vinyl resins which includes the step of removing solvent and non-solvent from the partly formed film by subjecting said film to heat while it is supported upon surfaces lubricated with an alcoholic composition which comprises at least one alcohol from the group consisting of ethylene glycol, polyethylene glycols, propylene glycol, polypropylene glycols, and glycerine together with a monohydric alcohol from the group consisting of butyl, amyl, hexyl and octyl alcohols.

HAROLD F. ROBERTSON.